United States Patent
O'Connor et al.

(10) Patent No.: US 11,144,045 B2
(45) Date of Patent: Oct. 12, 2021

(54) APPARATUS AND METHOD FOR REPAIR OF EDGE DEVICES

(71) Applicant: General Electric Company, Schenectady, NY (US)

(72) Inventors: Sean Philip O'Connor, San Ramon, CA (US); Mebrahtu G. Kifle, San Ramon, CA (US); Jose Cortez, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 16/224,219

(22) Filed: Dec. 18, 2018

(65) Prior Publication Data

US 2020/0192344 A1 Jun. 18, 2020

(51) Int. Cl.
*G05B 23/02* (2006.01)
*G05B 19/418* (2006.01)
*H04L 29/08* (2006.01)
*H04L 12/24* (2006.01)

(52) U.S. Cl.
CPC ..... *G05B 23/0283* (2013.01); *G05B 19/4185* (2013.01); *G05B 23/0221* (2013.01); *G05B 23/0267* (2013.01); *H04L 41/0677* (2013.01); *H04L 41/145* (2013.01); *H04L 67/12* (2013.01); *H04L 67/30* (2013.01); *H04L 67/34* (2013.01)

(58) Field of Classification Search
CPC ............ G05B 23/0283; G05B 23/0221; G05B 23/0267; H04L 67/12; H04L 67/30; H04L 67/34; H04L 41/0677; H04L 41/145
See application file for complete search history.

(56) References Cited

U.S. PATENT DOCUMENTS

| | | | |
|---|---|---|---|
| 9,282,164 B2 * | 3/2016 | Finn | H04L 67/327 |
| 10,412,052 B2 * | 9/2019 | Bone | H04W 4/70 |
| 2018/0040011 A1 * | 2/2018 | Milton | H04W 4/021 |

\* cited by examiner

*Primary Examiner* — Bryan Bui
(74) *Attorney, Agent, or Firm* — Fitch, Even, Tabin & Flannery LLP

(57) ABSTRACT

The attributes of a currently failed edge device are correlated with other devices having similar profiles or similar attributes. The correlating considers a history of operational patterns of the other edge devices over time. Based upon the results of the correlating, solutions to problems experienced by the other edge devices are identified. Selections from the solutions from the other edge devices are made and these selected solutions are to be implemented at the selected edge device in an effort to repair the selected edge device.

14 Claims, 9 Drawing Sheets

APPARATUS AND METHOD FOR REPAIR OF EDGE DEVICES

BACKGROUND OF THE INVENTION

Field of the Invention

The subject matter disclosed herein generally relates edge devices and, more specifically, to identifying and solving problems at or with these edge device.

Brief Description of the Related Art

Industrial machines operate at various types of industrial facilities. For example, various types of manufacturing equipment exists at some manufacturing facilities. In another example, power generation equipment exists at power plants. Wind turbines and associated support equipment are deployed at wind farms. Other examples of industrial machines are possible.

This industrial equipment typically has sensors that gathers or obtains time series data. This data is communicated to other processes, where it can be analyzed and various actions taken based upon the analysis. For example, the data can be analyzed to predict whether a piece of equipment will fail. Physical actions can then be instigated (e.g., the equipment can be repaired or replaced) based upon the results of the analysis. The analysis of the data may occur at the cloud or some location that is remote from the industrial facility.

Industrial equipment may need to communicate with the cloud (or other devices or networks). Analytics or other software may also need to be executed in proximity with or at the industrial equipment. For these purposes, edge manager devices ("edge devices") are sometimes deployed. The edge devices may include electronic processing and/or communication equipment to accomplish these functions. If the edge devices completely fail or fail to operate properly, this affects operation and efficiency of the industrial equipment and/or a broader system/network where the industrial equipment is deployed.

BRIEF DESCRIPTION OF THE INVENTION

The present invention is directed to identifying and repairing operational problems, issues, or failures at edge manager devices. Solutions to these problems are quickly and easily identified and implemented in order to repair or service improperly operating or failed edge manager devices. The analysis uses information from other edge manager devices having the same attributes, configuration, or using the same operating parameters. Similarly situated devices may have been repaired or serviced and the knowledge and solutions utilized at these similar devices can be leveraged to repair or service an improperly operating or failed edge manager device.

In some of these embodiments, an approach for repairing a broken, malfunctioning, or ineffectively operating edge manager device is provided. The edge manager device is coupled to an industrial machine.

Attributes of edge manager devices are collected and store at a database. The edge manager devices are configured to obtain data (e.g., time series data) from industrial machines.

Failure data of the edge manager devices is collected and stored at the database using sensors to collect the data. An edge device experiencing a failure is selected based at least in part upon an analysis of the failure data. A profile of the selected edge device is retrieved that includes attributes of the selected edge device.

The attributes of the selected edge device are correlated with other devices having similar profiles or similar attributes. The correlating considers a history of operational patterns of the other edge devices over time.

Based upon the results of the correlating, solutions to problems experienced by the other edge devices are identified. Selections from the solutions from the other edge devices are made and these selected solutions are to be implemented at the selected edge device in an effort to repair the selected edge device. The selected solutions are physically implemented at the selected edge device. The implementing includes one or more of: transmitting electronic control signals to the selected edge device, downloading computer code to the selected edge device, electronically instructing a robot to make a repair to the selected edge device, or sending an electronic alert to a technician to service the selected edge device. Other examples are possible.

In aspects, the attributes of the edge manager device include the make of the edge manger device, model of the edge manager device, CPU usage of the edge manger device, contract information relating to the edge manager device, warranty information concerning the edge manager device, operating system information of the edge manager device, owner of the edge manager device, location (e.g., geographic coordinates) of the edge manager device, or installation information concerning the edge manager device. Other examples are possible.

In one example, the correlating is performed at an electronic hub device on the same premise as the industrial machine. In other examples, the correlating is performed at the cloud. In still other examples, the correlating is performed at an electronic device that also implements the control system for the industrial machine.

In other aspects, a display to is utilized to present visual tiles to a user. The visual tiles act as filters that present information related to the other edge devices that has been filtered according to one or more attributes associated with the tile. In aspects, the tiles visually present one or more of the geography of edge device errors, the number of edge devices failures as the edge devices pass through a process, a pie chart of edge device errors, and a bar graph of edge device errors. Other examples are possible.

In others of these embodiments, a system is provided that repairs a broken edge manager device. The edge manager device is coupled to an industrial machine. The system includes a database and a control circuit.

The database stores attributes of edge manager devices. The edge manager devices are configured to obtain data from industrial machines. The database also stores collected failure data concerning failed or improperly operating edge manager devices.

The control circuit is coupled to the database. The control circuit is configured to select an edge device experiencing a failure based at least in part upon the failure data. The control circuit is configured to retrieve a profile of the selected edge device that includes attributes of the selected edge device and correlate the attributes of the selected edge device with other devices having similar profiles or similar attributes. The correlating considers a history of the operational patterns of the other devices over time.

The control circuit is configure to, based upon the results of the correlation, identify solutions to problems experienced by the other edge devices. The control circuit is further configured to select from the solutions from the other edge devices to implement at the selected edge device in an effort to repair the selected edge device.

The selected solutions are physically implemented at the selected edge device. The implementation includes one or more of: transmitting electronic control signals to the selected edge device, downloading computer code to the selected edge device, electronically instructing a robot to make a repair to the selected edge device, or sending an electronic alert to a technician to service the selected edge device.

In some examples, the control circuit is disposed at an electronic hub device on the same premise as industrial machine. In other examples, the control circuit is disposed at the cloud.

In still other examples, the control circuit is disposed at an electronic device that also implements the control system for the industrial machine.

In other aspects, the system further comprises an electronic display and the display is utilized to present visual tiles to a user. The visual tiles act as filters that present information related to the other edge devices that has been filtered according to one or more attributes associated with the tile. In examples, the tiles present one or more of a geography of edge device errors, the number of edge devices failures as the edge devices pass through a process, a pie chart of edge device errors, and a bar graph of edge device errors.

BRIEF DESCRIPTION OF THE DRAWINGS

For a more complete understanding of the disclosure, reference should be made to the following detailed description and accompanying drawings wherein.

Figure 1:
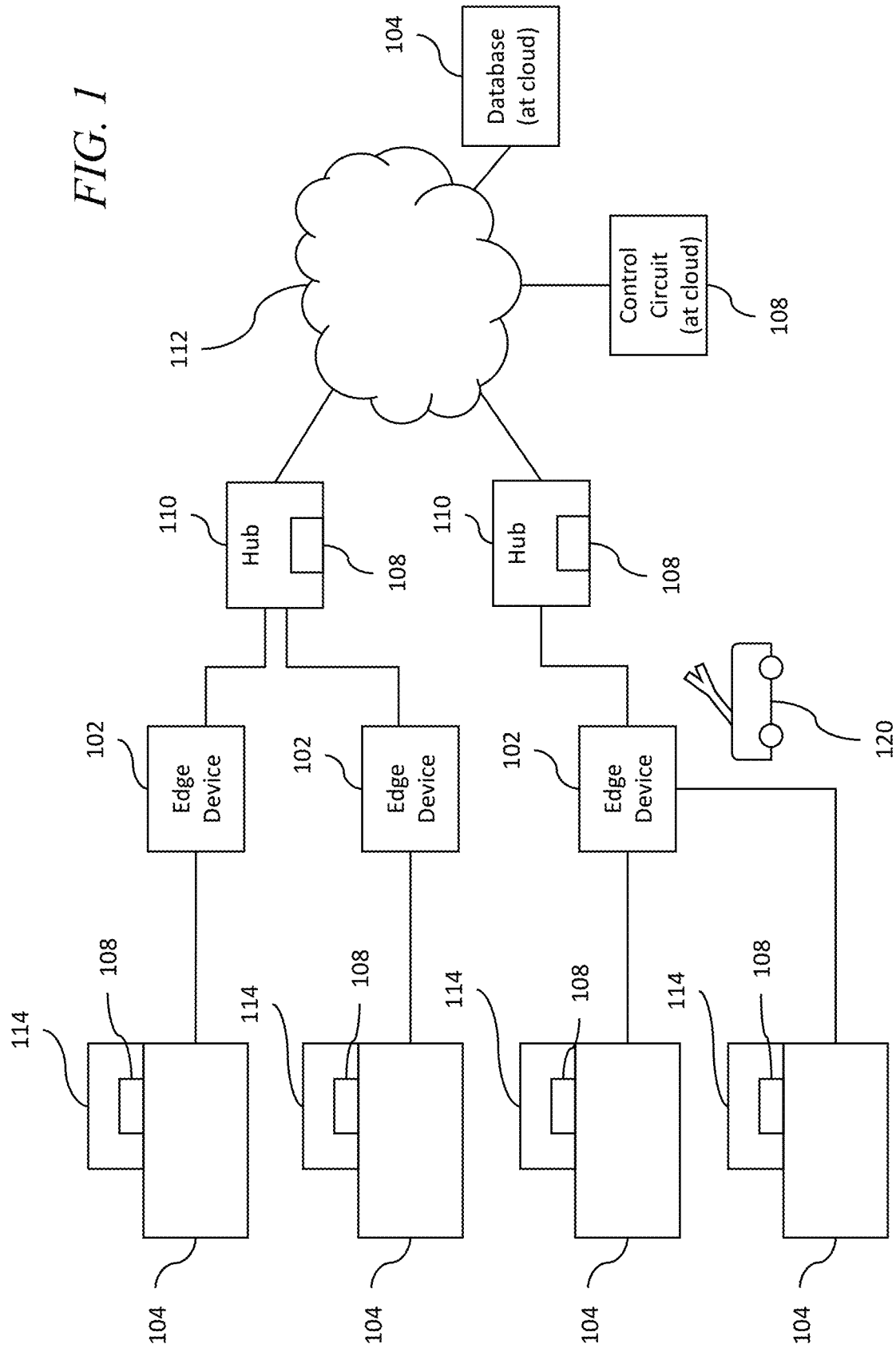
FIG. 1 comprises a diagram according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the present approaches, problems or other technical or operating issues at edge manager ("edge") devices are identified. Solutions to these problems are also identified and implemented to repair or service improperly operating or failed edge manager devices. The approaches provided herein utilize information obtained from or about other edge manager devices having the same attributes, configuration, or using the same operating parameters as the failed device. Similarly situated devices may have been repaired or serviced and the knowledge and solutions utilized at these similar devices can be leveraged to repair or service an improperly operating or failed edge device.

In aspects, the present approaches obtain and utilize attributes of a particular (e.g., failed) edge device to associate that particular device with other devices having like (or unlike) edge manager device characteristics and disposition. The approaches provided herein are utilized to detect, triage, trace, classify, analyze and/or troubleshoot faults within edge devices, nodes and networks, within both virtual and physical systems. The present approaches operationalize situational analysis of attributes that is not kept on the device itself, so an application can use the attributes (of failed devices) to act as a starting point to generate virtual scenarios of past failures or associated device groups. In aspects, a remote operator (either human or machine) can begin to "funnel" their way down to root-causes based on the troubleshooting system's recommendations.

In other aspects, the present approaches provide communication, control and root cause recommendations for particular edge devices, networks and system failures based on programmatically derived material and logistical analytics, especially for failures at scale.

In still other aspects, the approaches described herein utilize the attributes of (one to multiple) failed edge manager devices as filtering and finding criteria to cause an association to be made with other like or unlike devices. In aspects, this use of preloaded filter criteria is embodied as error tiles, which can be rendered on a screen for easy viewing and user consideration. The error tiles act as filter sets that can then be easily manipulated to provide a window into groups of devices and system components in the context of that particular filter set. Attributes can take a wide variety of forms. Examples of attributes are (but not limited to): the make of the edge manager device, the model of the edge manager device, the CPU of the edge manager device, the usage of the edge manager device, contract name (contract information) concerning the edge manager device, warranty information concerning the edge manager device, the operating system utilized by the edge manager device, the organization to which edge manager device belongs or is owned (organization ownership information), the location of the edge manager device, and installation information concerning the edge manger device (e.g., including who installed the edge device). Other examples are possible.

In addition to the aforementioned capabilities, the approaches described herein encompass the backend architecture and frontend visualization that maps (i.e., associates and maintains relationship orientation) of single to multiple device and system errors to other system or device errors that are not obviously part of the initial error set. An example of this error mapping can be implemented as any combination of hardware and/or software systems using device attributes to create associations between like or unlike hardware and/or software combinational groupings.

In other aspects, the approaches described herein also allow an operator to traverse and examine the relationships between groupings. In this context, "traverse" means any means of analysis that allows an operator to understand the relationship between groups and plot a logistical course of analysis regarding that relationship. In aspects, the approaches described herein encompass all interaction between an operator and the system, hardware and network relationships and their various organizational groups derived from attributes.

The approaches described herein provide processes and mechanisms of ensuring that network relationships and the relevance of those relationships are known and understood as an affordance to an operator. By programmatically derived relationships (as cross-cutting aspects of current failures and failures that have occurred in the past with similarly mapped devices), an operator can be provided with programmatically derived set of clues to the root cause of the failures they are currently experiencing.

Understanding root cause of a breakdown within an edge device and system is typically difficult, especially as these devices and networks may be unreachable themselves to provide insight into their errors (i.e. a device is offline and no error logs can be pulled from the device). A problem's complexity and severity increase exponentially when the number of devices and parts of a network increase. Ultimately, troubleshooting edge device networks at scale requires attention to the unique use cases and workflow needed to identify and correct large numbers of faults.

As edge networks and edge-to-cloud networks grow, the ability to allow remote and onsite operators to arrive at root causes of system, hardware and software failures is critical to efficiency and critical uptime associated with the assets connected to those machines. The approaches described herein provide programmatic assistance in arriving at a solution of network related problems more expeditiously than previous approaches. In fact, previous cloud and edge instances rely on the personal knowledge and intuition to obtain reasons behind failures. In contrast, the approaches described herein bring statistical data to the forefront of smart troubleshooting software.

In addition, the approaches described herein provide dashboard alarms and workflow software that allow an operator, user, or engineer to review status logs and alerts which provide insights to the errors returned by the computers in the network. This becomes extremely difficult to review when the logs are unreachable in a "down" device. When the device is offline, the remote operator and the onsite engineer are forced to use "hunting and pecking" probable solutions. Solutions may include starting and/or restarting the device, switching ports, or calling for technical assistance to mention a few examples.

In aspects, the approaches described herein are based on situational analysis of attributes not kept on the device itself so an application can use the attributes (of failed devices) to act as a starting point for the system to generate virtual scenarios of past failures or associated device groups. As mentioned, a remote operator can begin to "funnel" their way down to root-causes based on the troubleshooting system's recommendations.

Referring now to FIG. 1, a system 100 is provided that repairs a broken, failed, improperly operating, or ineffectively operating edge manager device. The system includes one or more edge manager devices 102 that are coupled to industrial machines 104. The system also includes a database 106 and control circuits 108.

The industrial machines 104 are any type of industrial machines such as grinders, drill passes, boilers, saws, drilling equipment, boilers, power generators, smelters, motors, medical equipment, vehicles, or engines to mention a few examples. In aspects, the industrial device 104 includes various types of sensors (e.g., thermometers or pressure gages to mention two examples) that record time series data (e.g., data that is sequentially obtained over time). This data may be sent to the control circuit 108 in the cloud 112 where the data may be analyzed to, for example, determine machine performance or predict machine failures. Electronic control devices 114 are associated with the industrial machines 104. The electronic control devices 114 implement a control system for the machines 104. In aspects, the control system is implemented as any combination of hardware and/or software and controls the operation of the machines 104. For instance, the control system implemented at the electronic control devices 114 may control movement of components (e.g., drills, valves, saw blades to mention a few examples). In some examples, the control system may also perform monitoring functions and collect time series data from sensors deployed at the machines.

The edge manager devices 102 are electronic devices configured to obtain data (e.g., time series data) from the industrial machines 104 (either directly from the machines or as shown in FIG. 1 via the electronic control devices). The edge manager devices 102 may also execute analytics that, in examples, analyze some of the time series data obtained from the machines and issue alerts to operators. In aspects, the edge manager devices 102 may include interfaces (e.g., including display screens) that present or render information to users or may allow the entry of information (e.g., through keypads, touch screens or other interfaces).

Electronic hub devices 110 facilitate communications between the industrial devices 104 and the cloud network 112. The cloud network 112 is any type of network and may include or be coupled to the database 106 and one or more of the control circuits 108. The network 112 is any combination of any type of electronic communication network such as the internet, wireless networks, cellular communication networks, wide area networks, local area networks. Other examples and combinations are possible.

The database 106 is deployed at the cloud network 112 and stores attributes of edge manager devices. The database 106 also stores collected failure data from failed (or improperly operating) edge manager devices 102 concerning the failed edge manager devices 102. The database 106 is any type of electronic memory or electronic memory storage device.

In the example of FIG. 1, control circuits 108 are disposed at various locations: the electronic hub devices 110 located on or at the same premise as industrial machine; at the cloud 112, and/or at an electronic control device 114 that also implements the control system for the industrial machine. In other aspects, control circuits 108 are deployed at each of these locations, but different functions are performed by each of the control circuits 108. For example, control circuits 108 at the edge devices 102 may gather data, control circuits 102 at the cloud 112 may perform the correlation approaches described herein, and control circuits 108 at the hub devices 110 may perform transmission and reception functions for electronic communications between different electronic entities.

The control circuit 108 at the cloud 112 is coupled to the database 106. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 108 may be configured (for example, by using corresponding programming stored in a memory as will be well understood by those skilled in the art) to carry out one or more of the steps, actions, and/or functions described herein.

In aspects, the control circuit 108 at the cloud 112 is configured to select one (or more) of edge devices 102 experiencing a failure based at least in part upon the failure data. For example, the control circuit 108 may compare data received from edge devices 102 and compare this to optimal thresholds to determine if a particular edge device 102 has failed. In other examples, an indication of a failures (e.g., a flag) is received from the edge device 102 indicating a failure. In still other examples, an operator at the edge device 102 manually sends an indication of failure for the edge device 102. In yet other examples, an operator at the cloud 112 reviews data from the edge devices 102 and determines a particular edge device 102 may have failed. In still other aspects, time series data is analyzed by the control circuit 108 at the cloud 112, and a prediction of future failure is made for a selected edge device 102. This future prediction is considered to be a failure for the purposes of the approaches described herein.

The control circuit 108 at the cloud 112 is configured to retrieve a profile of the selected edge device 102 from the database 106. The profile includes attributes of the selected edge device 102. The control circuit 108 at the cloud 112 and/or human users correlate the attributes of the selected edge device with other devices 102 having similar profiles or similar attributes. For example, the control circuit 108 may identify one attribute as being the maker or manufacturer of the edge device 102 and then examine the database 106 to find profiles of all other edge devices 102 having the same manufacturer. In another example, similar geographic locations (e.g., a particular state or city) may be an attribute and the control circuit 108 may identify other similarly situated edge devices. In these regards, the database 106 may include profiles of other edge devices 102. The profiles may be implemented and stored as any appropriate data structure. However, some data structures such as look-up tables allow for quick and efficient retrieval of information and performance of the correlation approaches described herein thereby improving the operation of the control circuit 108 when such data structures are utilized.

The correlation performed by the control circuit 108 at the cloud 112 and/or by operators may also consider a history of the operational patterns of the other devices over time. For example, a consideration of whether these other edge devices failed, when the devices failed, how long they failed, why they failed, and the solutions to these failures may be determined and/or considered. In one particular example, external events such as power outages, equipment replacements or upgrades, or weather events are considered and correlated with the failure data. For instance, failures of certain devices in certain geographic areas may align with power outages or software upgrades.

In aspects, the control circuit 108 at the cloud 112 is configured to, based upon the results of the correlation, identify solutions to problems experienced by the other edge devices. In these regards, the profiles of correlated edge devices may include or identify solutions to problems at these devices. The control circuit 108 at the cloud 112 is further configured to select from the solutions from the other edge devices 102 to implement at the selected edge device in an effort to repair, service, or improve the performance of the selected edge device 102.

It will be appreciated that the correlation functions may be implemented as software programs or subroutines, and visually presented to a user at a screen as visual tiles. Visual tiles refer to specifically defined display areas, formats, or structures displaying certain types of information. The tiles when rendered on the screen may allow interaction with users, for instance, allowing users to "drill down" in tile to find and display more information. In one example of a visual tile, a map is presented showing the geographic location of edge manger device failures. The tiles are placed on the screen to allow easy comparison for a human user.

The software implementing the tile effectively filters information, for instance, based upon attributes of the edge devices. In one specific example, the software filters all known edge devices 102 to show on a visual tile those edge devices 102 that have failed in the past and that are deployed within a certain geographic area. In other words, data is analyzed by the tile-displaying software, the data is analyzed for a particular attribute value or attribute range, and the data is prepared for and rendered on a display screen in a particular format (e.g., on a map, in a chart, or in a graph to mention a few examples). In some examples, each tile is created using a separate software subroutine or program.

As mentioned, the control circuit 108 at the cloud 112 (and/or user) can determine or retrieve solutions to issues or failures at other devices that have failed. The user or a control circuit 108 at the cloud 112 can be used to filter these solutions and select an appropriate solution to a particular edge device 102 that has currently failed. For example, a comparison (by the control circuit 108, the user, or both) can be made to the geography, model, and CPU usage of a failed edge devices 102 that have failed having the same geographic location, model, and CPU usage. From this, operational pattern information may determine that a power outage in an area resulted in damage to other edge devices that required the downloading of new software to these other and previously failed edge devices. Consequently, the identified solution is to download the new software to the currently failed edge manger device. Again, visual tiles may present this information to a user who can identify the relationships, and/or the control circuit 108 at the cloud 112 may automatically perform the correlation and determine a proposed solution.

Also and as previously mentioned, the correlation and solution selection functions may be implemented at any of the control circuits 108 including control circuits 108 at the electronic control devices 114, at the cloud 112, or the hubs 110. Human operators may also assist in the correlation and/or solution functions, for instance, using the tile as described herein.

The selected solution(s) to the failure of a particular edge device 102 are physically implemented at the selected edge device 102. In aspects, the implementation includes one or more of: transmitting electronic control signals to the selected edge device 102 (e.g., electronic control signals from the control circuit 108 at the cloud 112 to a failed edge device 102), downloading computer code to the selected edge device (from the control circuit 108 at the cloud 112 to a failed edge device 102), electronically instructing a robot 120 to make a repair to the selected edge device (e.g., sending electronic instructions from the control circuit 108 at the cloud 112 to the robot 120 at the premise of the edge device 102), or sending an electronic alert to a technician to service the selected edge device (e.g., electronic alert from the control circuit 108 at the cloud 112 to a failed edge device 102). Other examples are possible. The robot 120 may be an aerial drone, automated ground vehicle, or stationary device that has the structural mechanism (e.g., arms, grips, levers, and so forth) needed to make repairs or replace components.

It will be appreciated that these actions are physical in nature and are effective to perform a physical transformation of the failed edge device 102. For example, new computer code downloaded to the failed edge device 102 physically transforms the failed edge device 102 from a first state (or machine) to a second state (or machine). When the robot 120 is used to make repairs, the robot 120 is instructed to physically alter the machine. For example, the robot 120 may physically replace a circuit or control board of the failed edge device 102. To accomplish this, the robot may navigate through the site (e.g., factory, office, repair facility, or campus to mention a few examples) until it finds the edge device 102 and then performs the repair or replacement.

Figure 2:
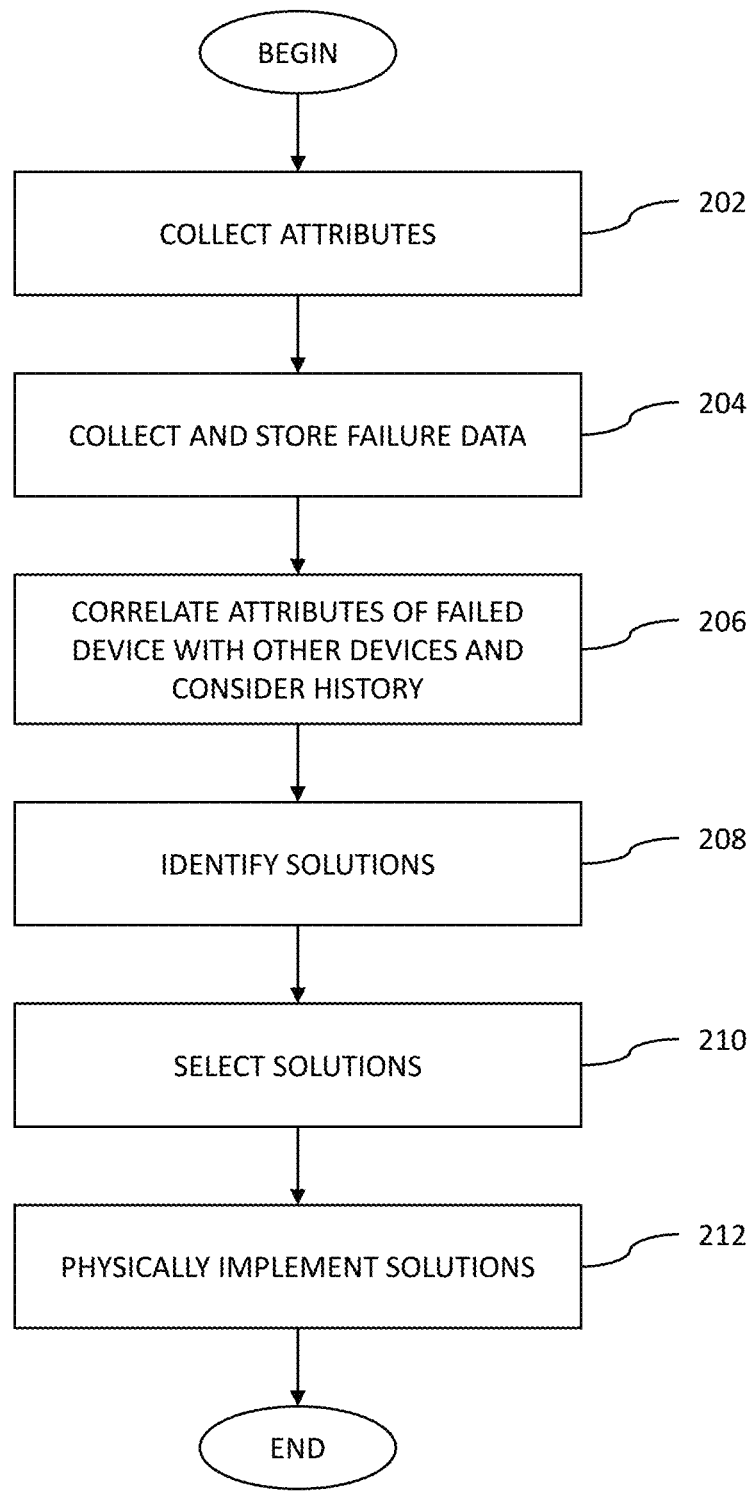
FIG. 2 comprises a flowchart according to various embodiments of the present invention.

Referring now to FIG. 2, an approach for repairing a broken, malfunctioning, or ineffectively operating edge manager device is provided. The edge manager device is coupled to an industrial machine.

At step 202, attributes of edge manager devices are collected and store at a database. The attributes include the make of the edge manger device, model of the edge manager device, CPU usage of the edge manger device, contract information relating to the edge manager device, warranty information concerning the edge manager device, operating system information of the edge manager device, owner of the edge manager device, location (e.g., geographic coordinates) of the edge manager device, or installation information concerning the edge manager device. Other examples are possible.

The edge manager devices are configured to obtain data from industrial machines. For example, the edge manager devices obtain time series data from the industrial machines. This time series data may include data that indicates whether a machine is operating properly (e.g., whether its components are properly functioning) and may also include data from sensors (e.g., temperature or pressure sensors) that indicate directly or indirectly whether the industrial machine is operating properly.

At step 204, failure data of the edge manager devices is collected and stored at the database using sensors to collect the data. An edge device experiencing a failure is selected based at least in part upon the failure data. In aspects, the failure data may be time series data obtained from sensors describing or indicating the operational status of the edge device. For example, a temperature sensor may indicate that the industrial machine is overheating. A profile of the selected edge device is retrieved that includes attributes of the selected edge device. The profile is includes in any appropriate at a structure such as a lookup table.

At step 206, the attributes of the selected edge device are correlated with other devices having similar profiles or similar attributes. The correlating considers a history of operational patterns of the other devices over time. For example, profiles of the other edge devices are retrieved from a database. Those profiles sharing attributes with the failed edge device are identified. The operational history or patterns of operation of the other devices are also identified. For instance, the timing of events such as power outages, hardware upgrades, or software upgrades with the other edge devices and failures associated with these failures are identified. In this way, other edge devices that experienced previous failures and having similar attributes are identified, events identified that may have contributed to the failures, and all of this correlated with a current failed edge device so that possible solutions can be identified. It will be understood that the correlation performed may be automatic (e.g. performed by a control circuit), manual, or a combination of manual and automatic.

At step 208, and based upon the results of the correlating, solutions to problems experienced by the other edge devices are identified. The profiles of the other failed edge devices may indicate solutions to the problems or failures experienced by these edge devices. In one example, a failed edge device (E1) shares attributes A1, A2, and A3 with two other edge devices (E2 and E3). A software upgrade is associated with the failures of E2 and E3, and a similar upgrade was attempted at failed edge device E1. The correlation identifies these relationships and identifies solutions at E2 and E3 (use a different software upgrade and physically replace a component on one of the electronic boards). Consequently, the system identifies the solution as being to replace the component and use the new software upgrade.

At step 210, selections from the solutions from the other edge devices are made and these selected solutions are to be implemented at the selected edge device in an effort to repair the selected edge device. In the above-mentioned example, a robot is instructed to repair the component at the failed edge device, and a new software upgrade is downloaded from the cloud to the failed edge device At step 212, the selected solutions are physically implemented at the selected edge device. The implementing includes one or more of: transmitting electronic control signals to the selected edge device, downloading computer code to the selected edge device, electronically instructing a robot to make a repair to the selected edge device, or sending an electronic alert to a technician to service the selected edge device. Other examples are possible. It will be appreciated that these physical actions physically change the failed edge device. For instance, the removal of components and replacement with new components physically alter the edge device. Similarly, changes to the software change the state of the edge device and potentially the functionality of the edge device.

Referring now to FIGS. 3-7, examples of visual tiles and using these tiles are described. In aspects, these figures represent one example a sequential traversal of various screens presented or rendered to users. It will be appreciated that other examples of visual tiles are possible and other sequences of traversing through these or other tiles are also possible.

As mentioned, the tiles may be implemented as software and displayed or rendered on a screen. A user can click on the tiles (or portions of the tiles), manipulate the tiles, drill down on certain tiles (or parts of the tiles) to gain more information, and perform other functions. The tiles act as filters and present filtered data to users. The criteria of data that is to be displayed by each tile may be set by a user utilizing a background application. Users can configure the types of error tiles, the number of tiles, the positioning of these tiles on the screen, and other characteristics for different data visualization of failures. The tiles are configured to show the same errors in their relationship to other filtered criteria (that will differ based upon a particular tile). For instance, failures of edge managers can be shown over a selected geographical area. Collections of tiles can be organized as visual workspaces and the content, layout, tile placement, and other characteristics of these workspaces can be saved and shared between users.

Any time groups of errors need to be viewed at scale, these errors can be shown or visualized as error tiles. In aspects, the user selects the tiles that provide a customized context for error visualization. For example, the user can select graph tiles (using different types of graphs to display errors), map tiles (mapping failures over geographic areas), or performance tiles (showing performance characteristics of failed edge devices). Other examples of tiles are possible.

Figure 3:
FIG. 3 comprises a diagram according to various embodiments of the present invention.

In aspects, a user configurable data visualization interface (e.g., smartphone, cellular phone, laptop, or personal computer) gives users additional context of the currently selected set of devices. A workspace (e.g., implemented as software) is saved according to and is associated with a user identifier. The work space 300 serves as a space where user places tiles. As shown in FIG. 3, one example of a work space 300 includes a graph 302. The graph 302 shows on the y-axis the number of device failures and on the x-axis discrete times (t=1, 2, etc.). This graph 302 is described in greater detail elsewhere herein.

In this example, there are 2045 device failures resulting in deployment of a software package upgrade from a first software package (BOM1) to a second software package (BOM2). An operator wants to place the 2045 errors in context with other devices that may have had similar conditions/problems when they were upgraded from BOM1 to BOM2 (or a similar upgrade, depending upon the level of specificity and threshold an operator sets when they create error tile criteria on the background application).

Figure 4:
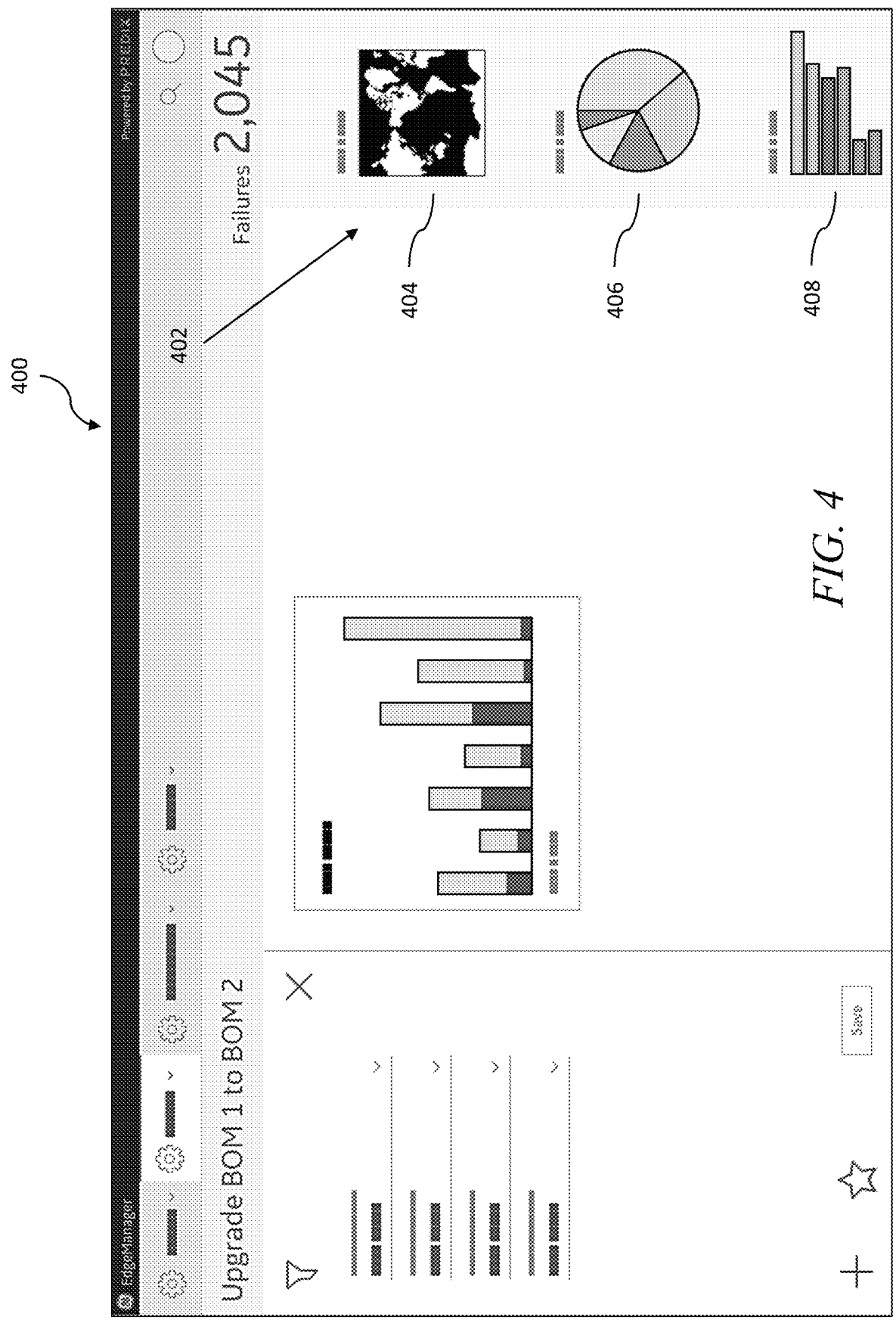
FIG. 4 comprises a diagram according to various embodiments of the present invention.

As shown in FIG. 4, the user opens an error tile panel 402 (on the right side of a screen 400) and the panel includes three tiles: a map tile 404, a first performance tile 406, and a second performance tile 408. The tiles 404, 406, and 408 show different types of views and different types of information. These tiles allow customers to add to their workspace their own customized views.

Figure 5:
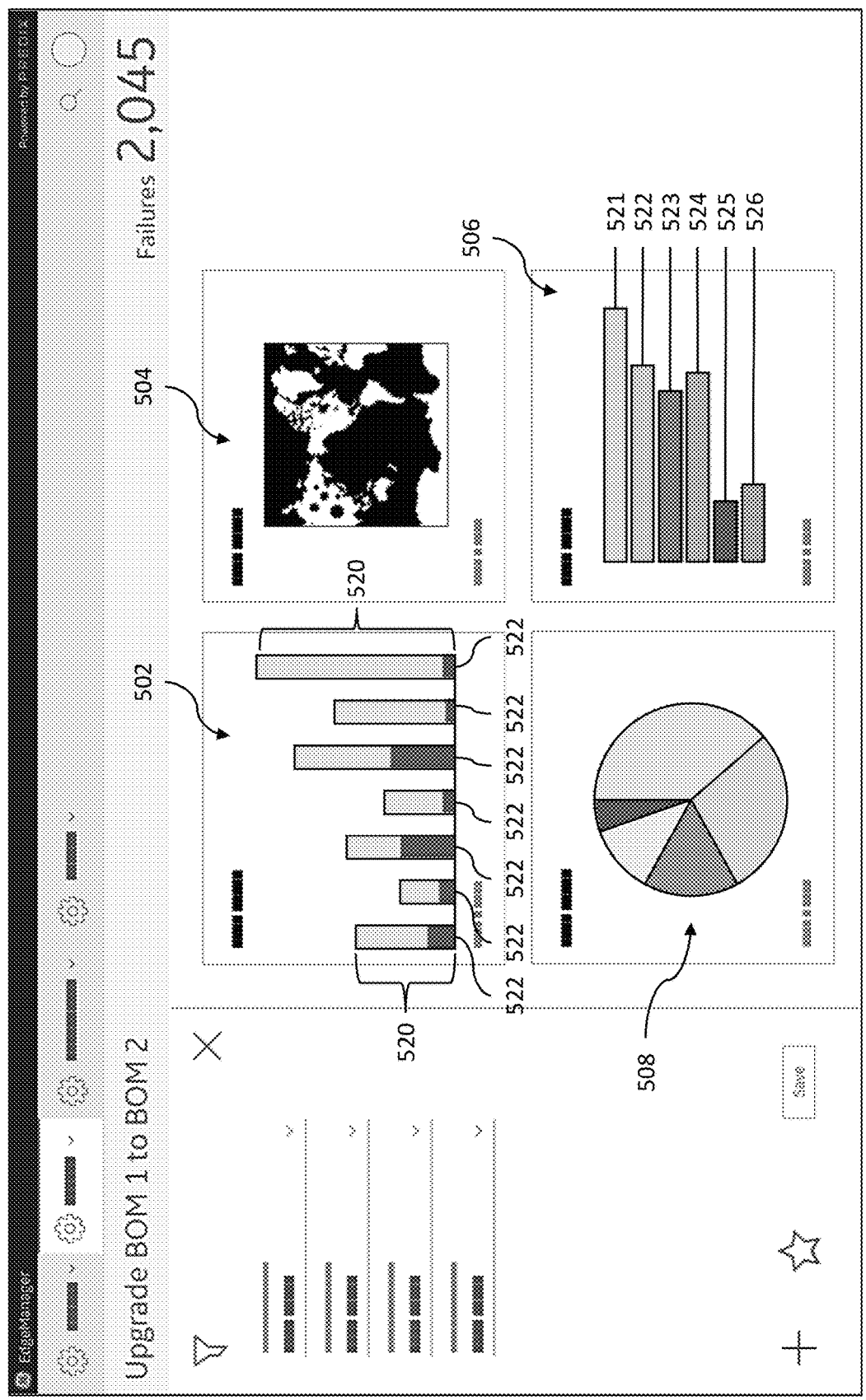
FIG. 5 comprises a diagram according to various embodiments of the present invention.

As shown in FIG. 5, the user identifies additional tiles that are set to their default trouble-shooting workspace using a screen 500.

A first tile 502 shows the performance of the 2045 devices when the 2045 devices ran a similar deployment (upgrade) process over the last 7 months. The y-axis represents number of devices being installed, while the x-axis represents discreet times. Each bar is divided into a first portion 520 which is the total number of devices, and a second portion 522, which is the number of failed devices. Thus, a first bar shows the number of failed device installations at a first time, the second bar shows the number of failed devices (out of a different total) at time=2, and so forth. The times (t=1, t=2, etc.) may represent discreet time from the past (a previous month). So the first time may be 7 months ago, a second time may be 6 months ago, and so forth. The tile 502 shows how edge device with errors benchmark against similar devices over periods of time. For example, it would show if at a particular time in the past whether there were a large number of errors. For instance, there might have been a weather event during a particular past point in time where many errors occurred.

Next to the first tile 502, a second tile 504 shows the 2045 devices displayed as clusters grouped by GPS coordinate identifiers. Using this tile, the operator can see that these devices are all in the same geolocated region. The cross context of the location and the benchmarked performance provides insight and intelligence that will lead to the discovery of clues as to the root cause and subsequent problems to focus on for a solution.

A third tile 506 shows bars 521, 522, 523, 524, 525, and 526. Each bar is a separate attribute. The x-axis represents number of failures. Thus, the first bar 521 may show 10 failures, the second 22 shows 8 failures, the third 523 shows 7 failures, the fourth 524 shows 8 failures, the fifth 525 shows 2 failures, and the sixth 526 shows 3 failures.

A fourth tile 508 is a pie chart showing the same or similar information as the third tile 506. In aspects, an operator can see the total device errors and the relative number of these of devices having particular attributes.

In many of these approaches, a slider is deployed on the screen, and the operator uses a slider to traverse time. That is, moving the slider (e.g., by clicking onto the slider and dragging the slider) traverses time.

The screen 500 shows how current errors are put in relationship with past errors based upon attributes of the devices that were previously in error. A slider lets the user slide back intimate to see similar errors in a sector. This can apply to data tables, maps, and all other types of error tiles.

For instance, an error in the same sector of a network may be experienced due to the same power source problem as other devices that experienced previous errors. Or, the different device types are failing due to a corruption discovered on the same version of a software package installed previously on other devices. Other examples are possible.

Figure 6:
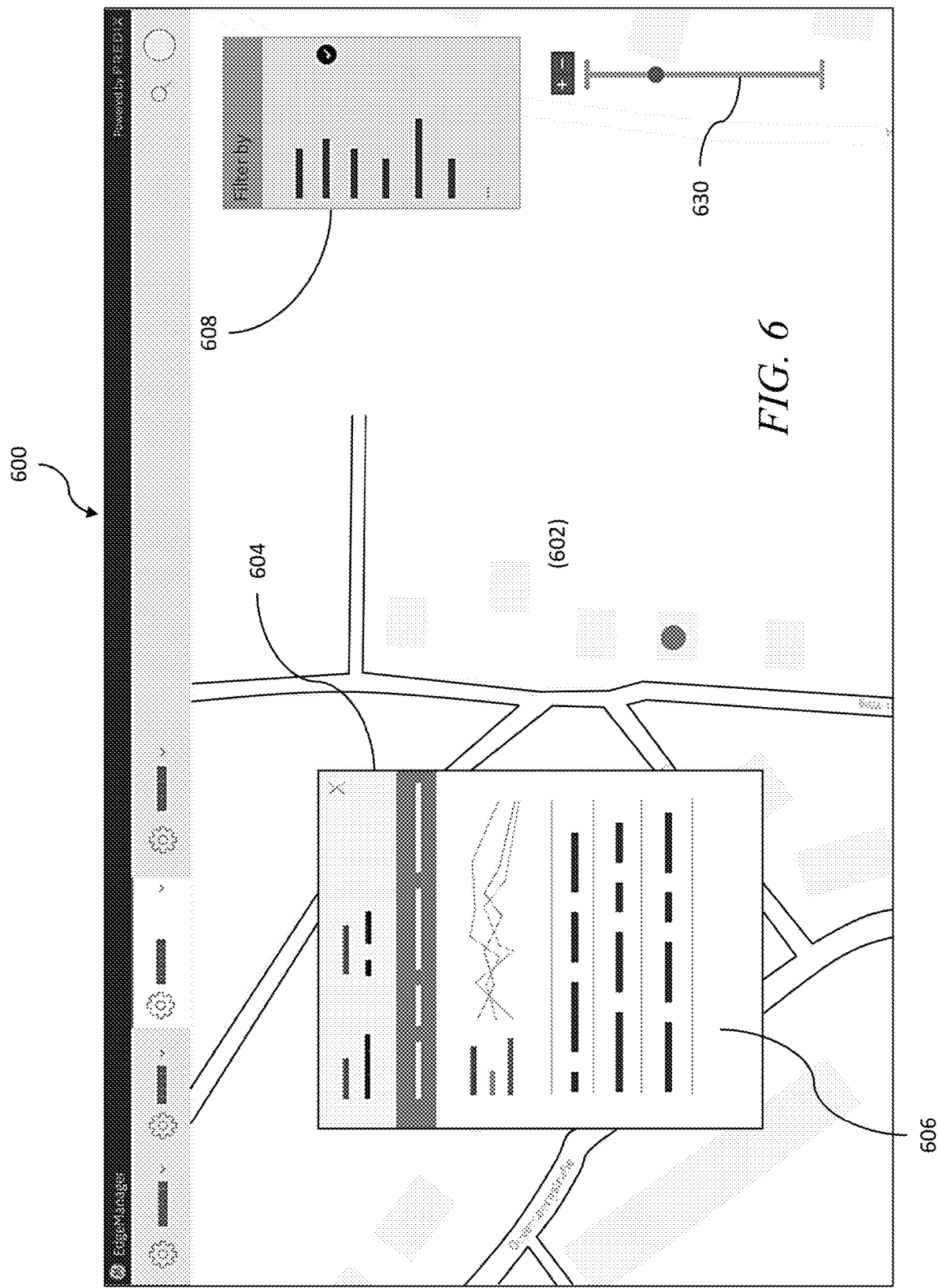
FIG. 6 comprises a diagram according to various embodiments of the present invention.

Referring now to FIG. 6, a screen 600 that shows the results of zooming in on a specific device (which can be accomplished by clicking on a device on a previous screen 500 or other ways) is described. The screen 600 shows more specific details including history and other related data. In a first area 602, the error is visualized on a map. Alternatively, a table including the error (in relation to other errors) could also be shown. A floating panel 604 on the screen appears when the user clicks on the error and selects device health details.

The floating panel 604 shows graphs on the screen, which in aspects, are color-coded and each shows an aspect of operation. These graphs may change as a slider 630 is engaged to move back-and-forth over time. By changing the relationships in time, a cross-cutting aspect of current failures and the failures that have occurred in the past with similarly mapped devices is made. Consequently, an operator is provided with a programmatically derived set of clues as to the root causes of a failure.

An attributes list 606 is a list of attributes associated with the device. Alternatively or in addition, the attributes list can also show 1,900 (failed) devices with Windows OS and 145 devices with Linus OS. A "filter by" list 608 shows filters currently being used. As mentioned, the slider 630 allows the user to move through time and change the content of the display to data that matches the time selected with the slider 630.

Figure 7:
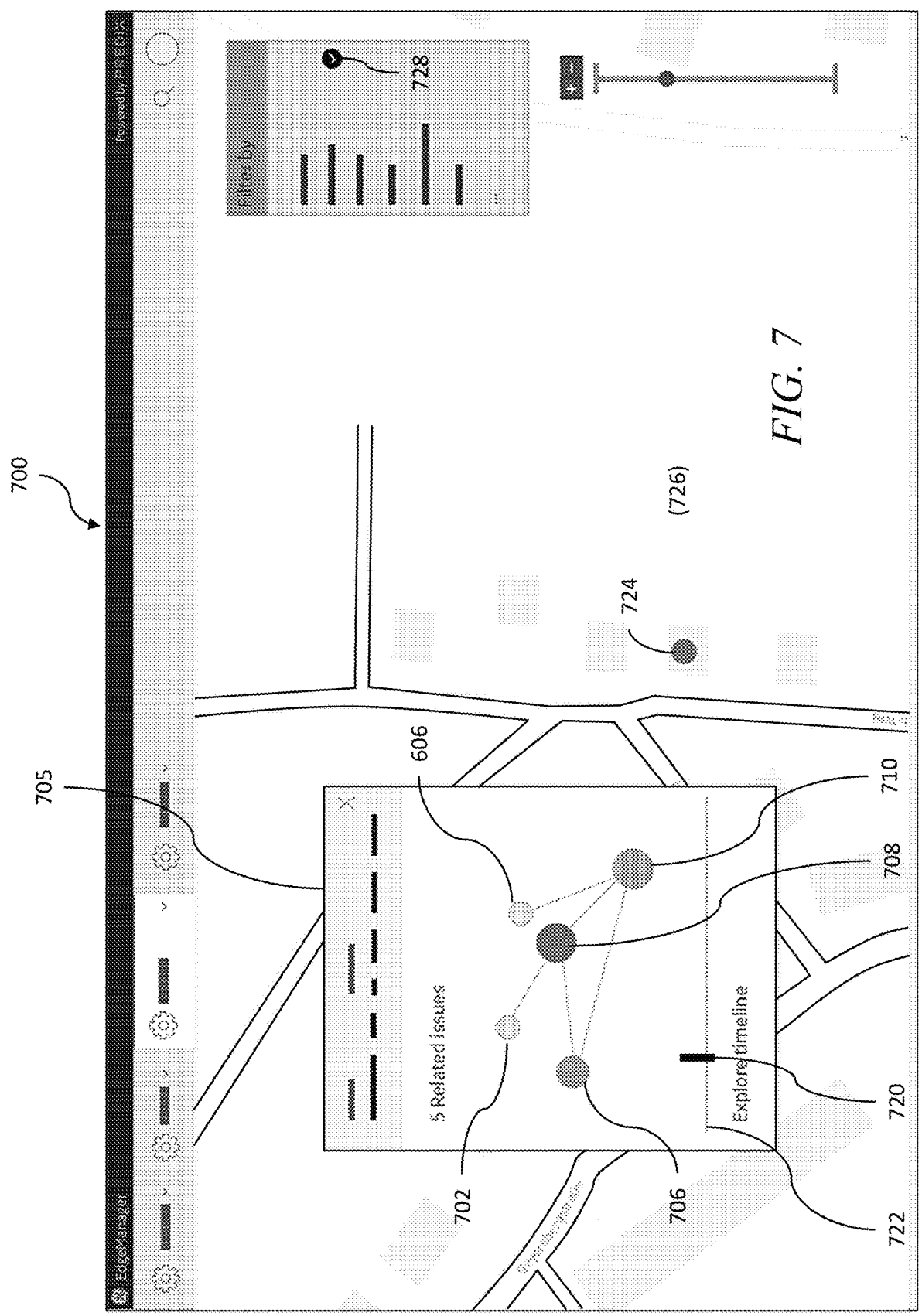
FIG. 7 comprises a diagram according to various embodiments of the present invention.

Referring now to FIG. 7, one example of a "deep-dive" screen or panel 700. The screen 700 is rendered when the user clicks on the floating panel 604 of FIG. 6. The panel 705 drills down to show relationships of issues in history. It can be seen that 5 related issues (702, 704, 706, 708, and 710) are found based upon device attributes. These are interrelated issues. Each issue (702, 704, 706, 708, and 710) is a group of devices that share device attributes. One of the issues (702, 704, 706, 708, and 710) may relate to an amount of CPU usage shared by failed devices, another may relate to a particular device manufacturer shared by failed devices, to mention a few examples.

The user sees related errors based upon an attribute. The issues (702, 704, 706, 708, and 710) may be colored and the saturation of the color may change. In aspects, the saturation of color may be a shade of red with some being of a lighter red and some being a deeper red. The lighter red color may represent that the error event or events occurred further back in time (based upon how the user slides the handle 720 right-to-left (or vice versa) on the timeline 722.

The size of the issues (702, 704, 706, 708, and 710) may change over time as the number of devices with errors and having the attributes of the dot (702, 704, 706, 708, and 710) changes. So, at a first time dot 702 may be bigger at t=1 and smaller at t=2 as (for example) the number of failed devices having a certain CPU changes.

The floating panel 705 appears when the user clicks on the device 724 (represented as a dot) on the map 726. The check mark on an attribute row 728 indicates the attribute that is being displayed on panel 705. This is a way to filter through all attributes.

The tile arrangements shown in FIGS. 3-7 may allow or help a user correlate errors and identify possible solution. It will be appreciated that these functions may also be performed automatically using a control circuit. In addition and in other aspects, a control circuit derives the tiles based upon supplied user criteria and changes the tiles based on user selections.

Figure 8:
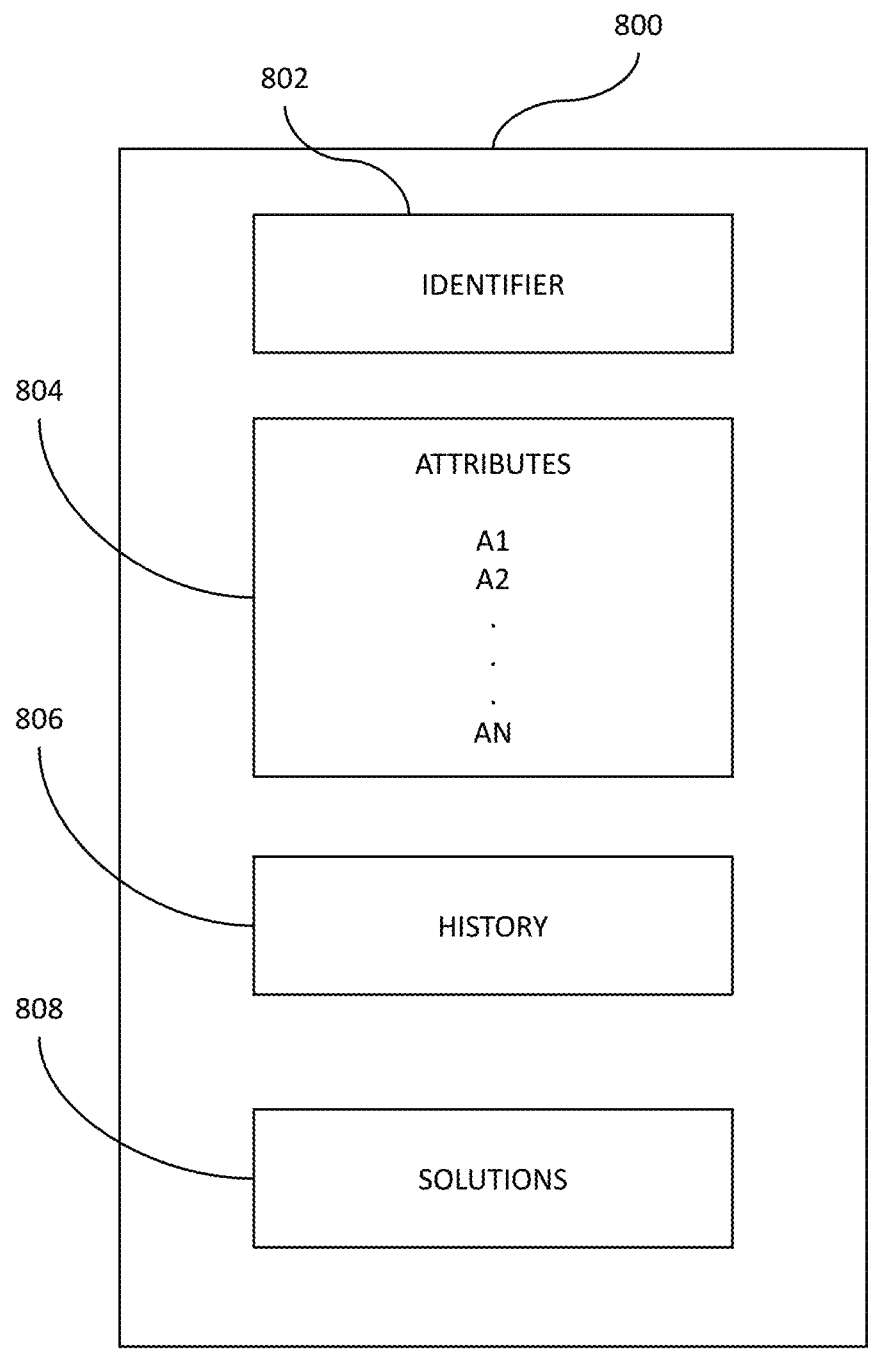
FIG. 8 comprises a diagram according to various embodiments of the present invention.

Referring now to FIG. 8, one example of an edge device profile 800 is described. The edge device has an identifier 802, a list of attributes 804 (including attributes A1, A2 . . . AN). The attributes include the make of the edge manger device, model of the edge manager device, CPU usage of the edge manger device, contract information relating to the edge manager device, warranty information concerning the edge manager device, operating system information of the edge manager device, owner of the edge manager device, location (e.g., geographic coordinates) of the edge manager device, or installation information concerning the edge manager device. Other examples are possible.

The profile 800 also has a history section 806 detailing characteristics of failures (e.g., timing and causes). Further, the profile 800 includes a solutions section 808 detailing solutions (e.g., hardware replacement, software upgrade) to problems of when the device failed. When the device did not or has never failed, this information may be indicated.

Figure 9:
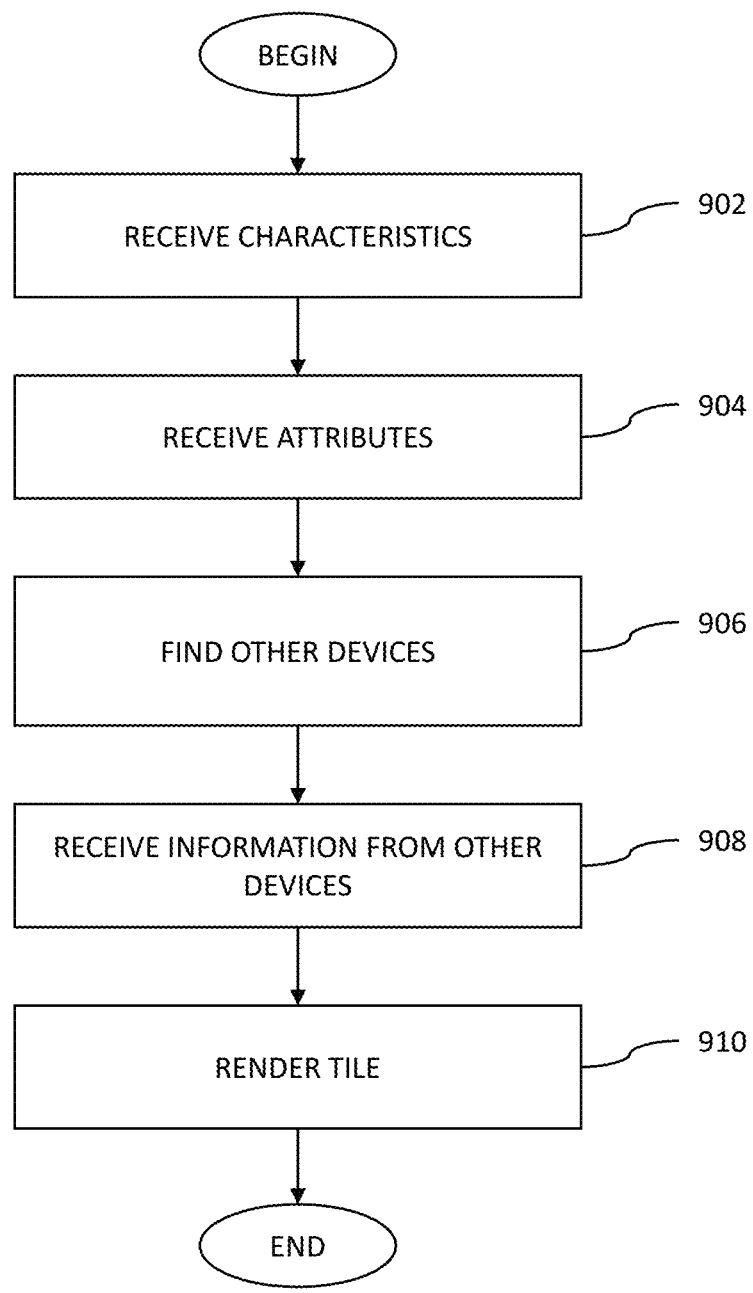
FIG. 9 comprises a flowchart according to various embodiments of the present invention.

Referring now to FIG. 9, one example of an approach for implementing a tile is described. It will be appreciated that this approach is one example of how a tile can be created and rendered on a display screen. Other examples are possible.

At step 902, characteristics of the desired tile are received from a user. For example, the user may wish to graphically show failures over time, or show the location of failed edge device on a map. This may be set-up during system initialization.

At step 904, attributes of the failed device are received. For example, the selected attributes may be the geographic coordinates of the device or the CPU usage of the failed device.

At step 906, other devices sharing the same attributes of the failed device are identified. For example, all devices (that have failures in the past) within a predetermined geographic area or having been manufactured by the same manufacturer (or both) are identified.

At step 908, information concerning these previously failed devices is received. For example, the exact geographical positions of the previously failed devices are retrieved.

At step 910, this information is rendered as a tile to a user. For example, the geographical locations of the previously failed devices are displayed (e.g., as dots or other icons) on a map.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method of repairing a broken edge manager device, the edge manager device being coupled to an industrial machine, the method comprising:
    collecting and storing at a database attributes of edge manager devices, the edge manager devices configured to obtain data from industrial machines;
    collecting and storing at the database failure data of the edge manager devices using sensors to collect the data;
    selecting an edge device experiencing a failure based at least in part upon the failure data;
    retrieving a profile of the selected edge device that includes attributes of the selected edge device;
    correlating the attributes of the selected edge device with other devices having similar profiles or similar attributes, the correlating considering a history of operational patterns of the other devices over time;
    based upon the results of the correlating, identifying solutions to problems experienced by the other edge devices;
    selecting from the solutions from the other edge devices to implement at the selected edge device in an effort to repair the selected edge device;
    physically implementing the selected solutions at the selected edge device, the implementing including one or more of: transmitting electronic control signals to the selected edge device, downloading computer code to the selected edge device, electronically instructing a robot to make a repair to the selected edge device, or sending an electronic alert to a technician to service the selected edge device.

2. The method of claim 1, wherein the attributes include the make, model, CPU usage, contract information, warranty information, operating system information, owner, location, or installation information.

3. The method of claim 1, wherein the correlating is performed at an electronic hub device on the same premise as industrial machine.

4. The method of claim 1, wherein the correlating is performed at the cloud.

5. The method of claim 1, wherein the correlating is performed at an electronic device that also implements the control system for the industrial machine.

6. The method of claim 1, wherein a display to is utilized to present visual tiles to a user, the visual tiles acting as filters that present information related to the other edge devices that has been filtered according to one or more attributes associated with the tile.

7. The method of claim 6, wherein the tiles present one or more of a geography of edge device errors, the number of edge devices failures as the edge devices pass through a process, pie chart of edge device errors, and a bar graph of edge device errors.

8. A system for repairing a broken edge manager device, the edge manager device being coupled to an industrial machine, the system comprising:
    a database that stores attributes of edge manager devices, the edge manager devices configured to obtain data from industrial machines, the database also storing collected failure data concerning failed edge manager devices;
    a control circuit coupled to the database, the control circuit configured to:

select an edge device experiencing a failure based at least in part upon the failure data;

retrieve a profile of the selected edge device that includes attributes of the selected edge device;

correlate the attributes of the selected edge device with other devices having similar profiles or similar attributes, the correlating considering a history of the operational patterns of the other devices over time;

based upon the results of the correlation, identify solutions to problems experienced by the other edge devices;

select from the solutions from the other edge devices to implement at the selected edge device in an effort to repair the selected edge device;

wherein the selected solutions are physically implemented at the selected edge device, the implementation including one or more of: transmitting electronic control signals to the selected edge device, downloading computer code to the selected edge device, electronically instructing a robot to make a repair to the selected edge device, or sending an electronic alert to a technician to service the selected edge device.

9. The system of claim 8, wherein the attributes include the make, model, CPU usage, contract information, warranty information, operating system information, owner, location, or installation information.

10. The system of claim 8, wherein the control circuit is disposed at an electronic hub device on the same premise as industrial machine.

11. The system of claim 8, wherein the control circuit is disposed at the cloud.

12. The system of claim 8, wherein the control circuit is disposed at an electronic device that also implements the control system for the industrial machine.

13. The system of claim 8, further comprising an electronic display and wherein the display is utilized to present visual tiles to a user, the visual tiles acting as filters that present information related to the other edge devices that has been filtered according to one or more attributes associated with the tile.

14. The system of claim 13, wherein the tiles present one or more of a geography of edge device errors, the number of edge devices failures as the edge devices pass through a process, pie chart of edge device errors, and a bar graph of edge device errors.

* * * * *